Aug. 4, 1959 J. F. SCULLY 2,898,403

DISTRIBUTOR

Filed Feb. 21, 1956 3 Sheets-Sheet 1

INVENTOR:
JOHN F. SCULLY
BY E. J. Sight
ATTORNEY

INVENTOR:
JOHN F. SCULLY
BY E. J. Sight
ATTORNEY

Aug. 4, 1959 J. F. SCULLY 2,898,403

DISTRIBUTOR

Filed Feb. 21, 1956 3 Sheets-Sheet 3

INVENTOR:
JOHN F. SCULLY
BY
ATTORNEY

United States Patent Office 2,898,403

Patented Aug. 4, 1959

2,898,403

DISTRIBUTOR

John F. Scully, Glen Gardner, N.J., assignor to Monroe Calculating Machine Company, Orange, N.J., a corporation of Delaware Application February 21, 1956, Serial No. 566,939

6 Claims. (Cl. 178—53.1)

This invention relates to distribution systems and more particularly to an improved electronic distribution system.

Prior-art distribution systems generally employ some form of mechanical or electro-mechanical rotating apparatus to effect a parallel-to-serial or serial-to-parallel translation of data or data bits between an input/output device such as a teletypewriter machine and data-processing means exemplified by an electronic computer. In these systems the mechanical rotating distributor is geared to a motor synchronized with the teletypewriter. Such systems have been found to be relatively slow-operating, bulky in size and not wholly compatible for use with electronic equipment.

The principal object of the invention, therefore, is the provision of an electronic distributor which overcomes the objectionable features of prior-art mechanical distributors noted above. Accordingly, the invention comprises an electronic oscillating means operating in conjunction with an electronic counter or timing means to produce a series of staggered-in-time distribution pulses as well as periodic sensing pulses which in combination with coincident data bits from a teletypewriter or computer may be translated to the receiving computer or teletypewriter, respectively.

Serial-to-parallel or parallel-to-serial translation of data bits is accomplished by means of the invention at faster rates of speed which are completely compatible with a greater variety of both input and output devices alike than is possible with prior-art distribution arrangements. The proposed invention being all-electronic in construction is likewise more compact and efficient to operate than current devices of this nature known to the art.

Figure 1:
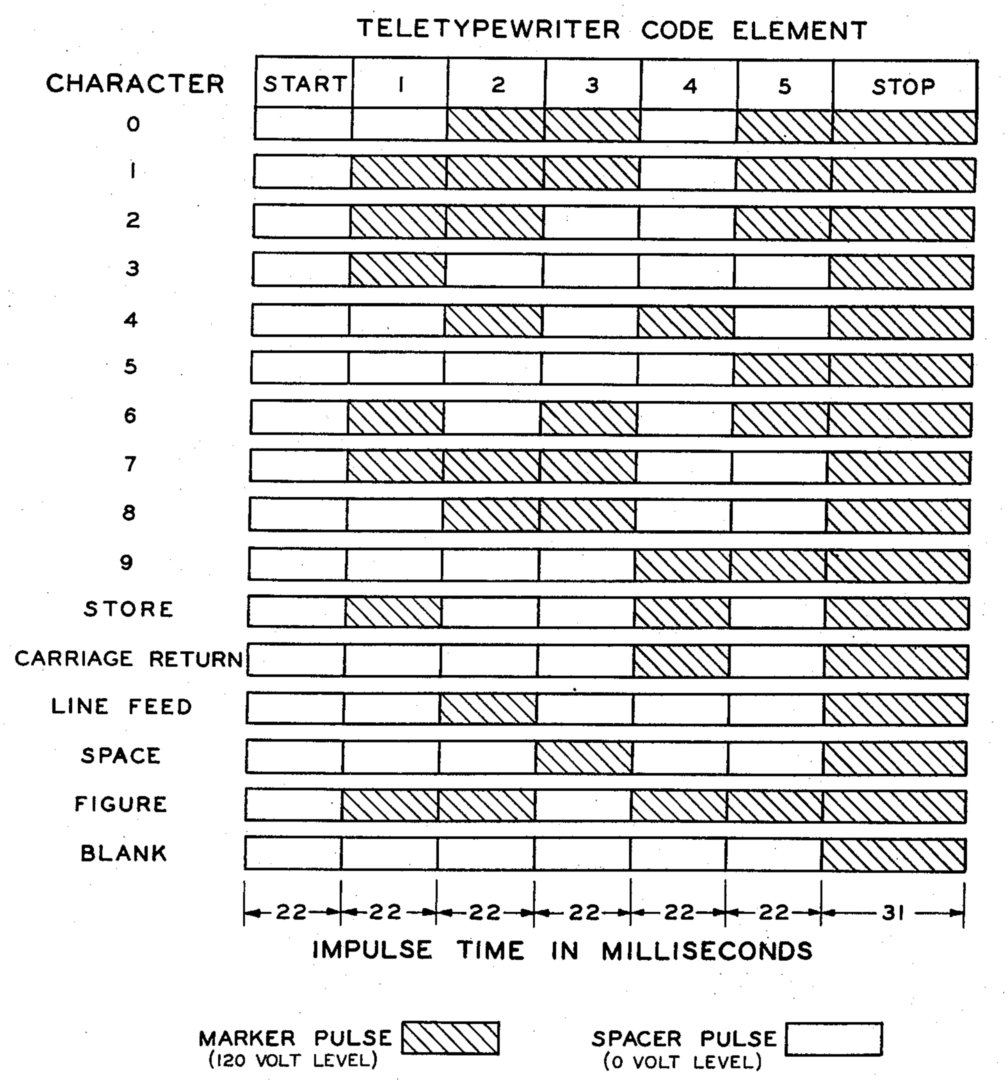
Figures 2, 4:
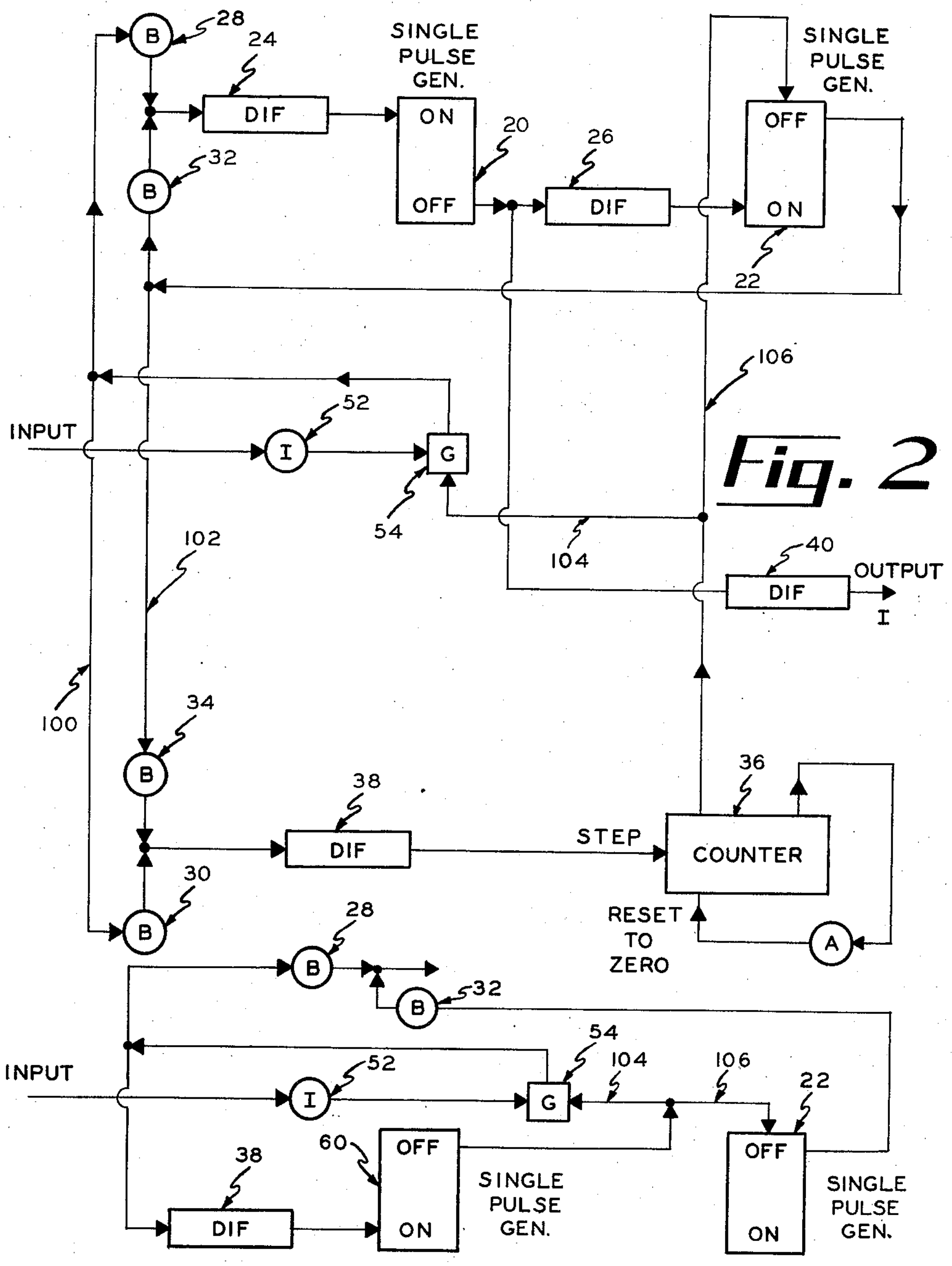
Figure 3:
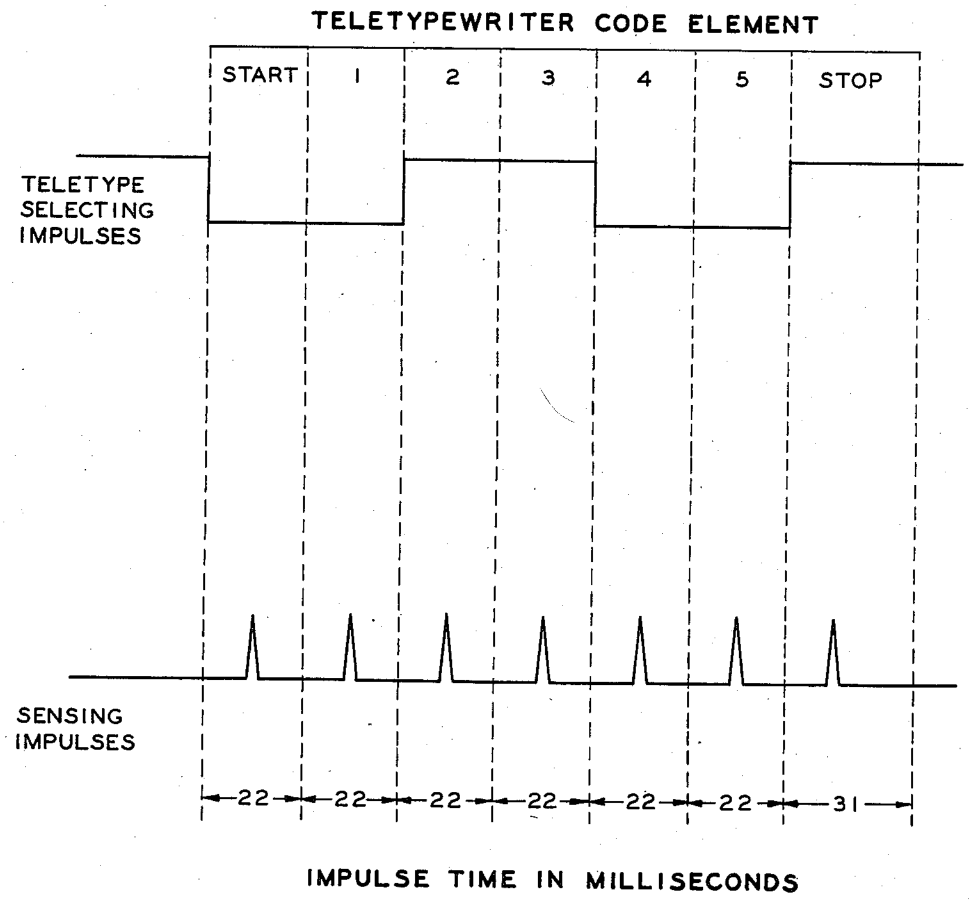

Other objects and features of the invention will become apparent from the following description when read in the light of the attached drawings of which:

Fig. 1 is a tabulation of teletypewriter code-element combinations for certain characters and instructions, Fig. 2 is a block schematic diagram of one embodiment of the means of the invention, Fig. 3 is a timing diagram for the means of the invention, and Fig. 4 is a block schematic diagram of a modification of the means of the invention illustrated in Fig. 2.

An exemplary application of the means of the invention is in a data-processing system where it functions as the intermediate link between a transmitting teletypewriter and a data processing means as well as between the data processing means and a receiving teletypewriter. Since in this example the invention performs a translation function between teletypewriter equipment and data-processing means such as an electronic computer, it is desirable to review those characteristics of teletypewriter operation on which operation of the invention is based.

The basic telegraph code is represented by various combinations of five digits or impulses representing either high or low voltage levels of say 120 or 0 volts, respectively, for each code character. High-voltage-level signals are called "marker" signals while those representing the low-voltage-level are called "spacer" signals. Both marker and spacer signals each have a normal time duration of say 22 milliseconds for 60-word-per-minute teletypewriter operation. In addition, each key depression, representing a particular character or teletypewriter operation, produces an initial "start" spacer signal of uniform length immediately preceding the regular five-digit code combination, as well as for example a non-uniform 31-millisecond marker "stop" signal on completion of the code combination. The 31-millisecond stop or high-voltage marker signal is the minimum time spacing between the end of one five-digit impulse-code combination and the normal spacer start signal of the following code combination. Various standard start-stop, five-unit code combinations are shown in Fig. 1.

Block diagram of the distributor of the instant invention is shown in Fig. 2. The heart of the invention is a pair of timed single pulse generators 20 and 22 which furnish the necessary continuous oscillation or sensing requirement of the distributor, so arranged that once started they will continue to "talk back" to each other. Timed single pulse generators 20 and 22 may take the form of one-shot multivibrators as shown in Radar Electronics Fundamentals, Navships 900,016 at page 194. Timed single pulse generators 20 and 22 are triggered by differentiators 24 and 26, respectively, which may be of the well known R-C circuit type.

The counting sequence for the distributor is provided by a counter 36 which is caused to step by a differentiator 38, which may be of the well known R-C circuit type. Counter 36 may take the form of any of the known electromechanical or electronic counters for which reference may be had to High Speed Computing Devices by the Staff of Engineering Research Associates, Inc., McGraw-Hill Book Co., Inc., 1950. On completion of a counting or stepping cycle, counter 36 is reset to its home position or zero stage, and the zero stage output is fed to pulse generator 22 which stops the oscillation of the two pulse generators 20 and 22 ending the cycle.

Generation of a series of signals I corresponding to the code elements of a standard start-stop, five-unit code character allows a serial sensing-in-time operation to be performed.

In order to synchronize a teletypewriter with a computer, or any other data-handling device, it is necessary that the distributor, or specifically pulse generators 20 and 22 in said distributor, be initially in a quiescent state. The distributor is at rest by virtue of the fact that counter 36, which is on stage zero at the time, holds the pulse generator 22 in its quiescent state and hence inhibits operation thereof. For the stated condition, the output from the teletypewriter and hence the input to the distributor, is at a continuous high-voltage-level of say 120 volts. The input signal is fed to an inverter 52, of any well known type, and the resultant output conditions one of the inputs to coincidence gate 54 to inhibit operation thereof. The other input to said coincidence gate, which is permissive at this moment, is received from the zero or home stage of counter 36. Since the gate 54 is inhibited by the output from inverter 52, a low-level output from coincidence gate 54 is present and the distributor remains quiescent.

Depression of one of the teletypewriter's keys initiates the usual 22-millisecond-spacer start pulse (Fig. 1), setting the distributor in continuous oscillation so that the five-unit code and stop signal to follow may be translated. The distributor input which is now low is inverted by inverter tube 52, the high output from which then passes through coincidence gate 54 as a high signal to differentiators 24 and 38 via buffers 28 and 30, respectively. Differentiator 38 triggers counter 36 causing it to step from its home position or stage 0 to stage 1, while differentiator 24 triggers pulse generator 20 causing the generation of a single timed pulse. The trailing edge of the generated pulse from pulse generator 20 is differentiated in differentiator 26 and applied to pulse generator 22 causing the generation of a single timed pulse thereby. Pulse generator 22 is operable at this time because counter 36 was previously stepped from stage 0 to stage 1 by the start pulse of the input signal, thereby removing the inhibition of the operation of this pulse generator. The output of pulse generator 22 is fed by way of buffer 32 back to differentiator 24 whose output is used to trigger pulse generator 20 again, as well as by way of buffer 34 to differentiator 38 whose output triggers counter 36 which steps from position 1 to position 2. Pulse generator 20 provides another output by way of differentiator 40 the output from which is used as a sensing pulse for translating the standard start-stop, five-unit code.

Thus pulse generators 20 and 22 continue to oscillate or "talk back" to each other. During this period inverter 52 and coincidence gate 54 may be considered divorced from the circuit since the pair of pulse generators exercise complete control of the distributor. The pulse generators 20 and 22 are adjusted so that the width of the pulses generated thereby maintain said pulse generators oscillating in proper phase relationship, each with a normal pulse period of 11 milliseconds. Successive output pulses from pulse generator 22 cause counter 36 to step from stage 2, to stage 3, etc. until stage 7 is reached at which time the counter will have cycled back to its 0 stage or an output from stage 7 is applied to reset counter 36 to its 0 stage. The output from stage 0 of counter 36 in hibits operation of pulse generator 22 thus ending the current cycle immediately after pulse generator 20, which was triggered on by generator 22, cuts off. The output from the 0 stage of counter 36 also conditions coincidence gate 54 to operate preparatory to starting the next cycle.

Reference to Fig. 3 shows how a series of signals I, corresponding to the start pulse, five code elements of a teletypewriter character, and stop signal, generated by the oscillating action of pulse generators 20 and 22 in sequence with the action of counter 36, permits of a sensing operation to be performed on the incoming teletypewriter signal such as for example the numeral "8."

Operation of the means of the invention is the same both for teletypewriter input and output operations; the code signals being fed to inverter 52 as well as to the translating equipment from the teletypewriter for an input operation or to the teletypewriter from the translating equipment for an output operation.

A modification of the invention which utilizes a single timed pulse generator in place of counter 36, is shown in Fig. 4. Here single timed pulse generator 60, which may be of the type used for pulse generators 20 and 22, is substituted for counter 36 and produces a single timed output lasting from the time the leading edge of the start pulse is presented to inverter 52 until after pulse generator 22 has been triggered off at the end of its last desired operation in a cycle but before the pulse generator 20 has been triggered off at the end of its last desired operation in a cycle. Since pulse generators 20 and 22 each have a time constant for producing a pulse of 11 milliseconds, and it is desired to have pulse generator 20 operate 7 times with an operation of pulse generator 22 being interposed between successive operations of pulse generator 22, the time constant for producing a pulse for pulse generator 60 will be at least 132 but not greater than 143 milliseconds. As shown in Fig. 4 the non-operative output of pulse generator 60 via line 104 alerts gate 54 to pass a start signal applied thereto and via line 106 holds pulse generator 22 in a non-operative condition. A start signal appearing at gate 54 is passed thereby and differentiated by differentiator 38 to trigger on pulse generator 60. In the pulse producing state, pulse generator 60 removes its inhibition of pulse generator 22 via line 106 and removes the permissive signal from gate 54 via line 104. The pulse generators 20 and 22 will operate as previously explained producing sampling pulses I, 11 milliseconds after the initial application of a start signal and every 22 milliseconds thereafter until pulse generator 60 triggers itself off to hold pulse generator 22 in a non pulse-producing state and end the production of sampling pulses after the next succeeding sampling pulse.

While the preceding descriptions have exemplified use of the invention for standard start-stop, five-unit code, it is specifically applicable to any fixed number of pulse times per character, uniform length pulse time code wherein a start pulse is present or provided for each character.

While there has been described but a limited number of embodiments of the means of the invention, it is believed evident that many changes or modifications can be made therein without departing from the spirit of the invention. It is not desired, therefore, to limit the scope of the invention except as set forth in the appended claims or as dictated by the prior art.

I claim:

1. A distributor for producing a predetermined number of uniformly spaced pulses in response to a start signal, comprising a first and a second single timed pulse generator, an output from said first pulse generator triggering on said second pulse generator and an output from said second pulse generator triggering on said first pulse generator, a gating means responsive to a start signal to trigger on said first pulse generator and a timing means connected to said gating means and to one of said pulse generators, said timing means in one state rendering said one of said pulse generators inoperative and in a state other than said one state rendering said input means non-responsive to start signals applied thereto, and an output connection from one of said pulse generators.

2. A distributor as claimed in claim 1 wherein said timing means comprises a third single timed pulse generator connected to be triggered on by said gating means.

3. A distributor as claimed in claim 1 wherein said timing means comprises a pulse counter whose inactive state is represented by a cleared condition to which said counter is returned after receipt thereby of a predetermined number of pulses and whose input is connected to the output from said gating means and to the output from one of said pulse generators.

4. A distributor for producing a plurality of uniformly spaced sensing pulses for sensing an input pulse train containing a predetermined number of pulse positions and a start pulse, comprising a first and a second single timed pulse generator, an output from said first pulse generator triggering on said second pulse generator and an output from said second pulse generator triggering on said first pulse generator, a gating means to which the input pulse train is applied connected to trigger on said first pulse generator in response to the start pulse in said input pulse train, a timing means connected to render inoperative said second pulse generator when said timing means is in an inactive state and connected to render said gating means non-responsive to input pulses when said timing means is in an active state, said gating means being further connected to render said timing means active in response to said start pulse in said input pulse train, and an output for sensing pulses connected to said first pulse generator.

5. A distributor as claimed in claim 4 wherein said timing means comprises a third single timed pulse generator connected to be triggered on by said gating means.

6. A distributor as claimed in claim 4 wherein said timing means comprises a pulse counter whose inactive state is represented by a cleared condition to which said counter is returned after receipt thereby of a predetermined number of pulses and whose input is connected to the output from said gating means and to the output from one of said pulse generators.

References Cited in the file of this patent

UNITED STATES PATENTS

| | | |
|---|---|---|
| 2,582,218 | Slaytors | Jan. 15, 1952 |
| 2,749,386 | Wright | June 5, 1956 |
| 2,752,425 | Dain | June 26, 1956 |
| 2,762,863 | Wheeler | Sept. 11, 1956 |
| 2,806,901 | Ferguson | Sept. 17, 1957 |

OTHER REFERENCES

Western Union Technical Review, January 1956, pp. 20–26.

"Transistor Type Transmitter Distributor" by H. Isaacs.